United States Patent
Feldman et al.

(10) Patent No.: US 8,335,897 B2
(45) Date of Patent: Dec. 18, 2012

(54) DATA STORAGE MANAGEMENT IN HETEROGENEOUS MEMORY SYSTEMS

(75) Inventors: Timothy Richard Feldman, Louisville, CO (US); Wayne Howard Vinson, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 423 days.

(21) Appl. No.: 12/638,197

(22) Filed: Dec. 15, 2009

(65) Prior Publication Data

US 2011/0145537 A1 Jun. 16, 2011

(51) Int. Cl.
*G06F 12/00* (2006.01)
*G06F 12/02* (2006.01)

(52) U.S. Cl. ............... 711/156; 711/171; 711/E12.001; 711/E12.002

(58) Field of Classification Search .................. 711/156, 711/171, E12.001, E12.002
See application file for complete search history.

(56) References Cited

U.S. PATENT DOCUMENTS

| | | | |
|---|---|---|---|
| 2008/0140883 A1 | 6/2008 | Salessi et al. | |
| 2008/0140919 A1* | 6/2008 | Torabi et al. | 711/103 |
| 2008/0209116 A1 | 8/2008 | Caulkins | |
| 2008/0222371 A1 | 9/2008 | Caulkins | |
| 2010/0174876 A1* | 7/2010 | Kasahara et al. | 711/154 |

* cited by examiner

*Primary Examiner* — Yong Choe
(74) *Attorney, Agent, or Firm* — Alan G. Rego; Westman, Champlin & Kelly, P.A.

(57) ABSTRACT

A data storage management system is provided, which includes multiple storage entities with differing storage characteristics. A controller is communicatively coupled to each of the multiple storage entities. The controller is configured to associate one or more storage attributes of a received object with one or more of the different storage characteristics, and to store the received object in one or more of the multiple storage entities based on the association of the one or more of the storage attributes of the received object with the one or more of the different storage characteristics.

11 Claims, 8 Drawing Sheets

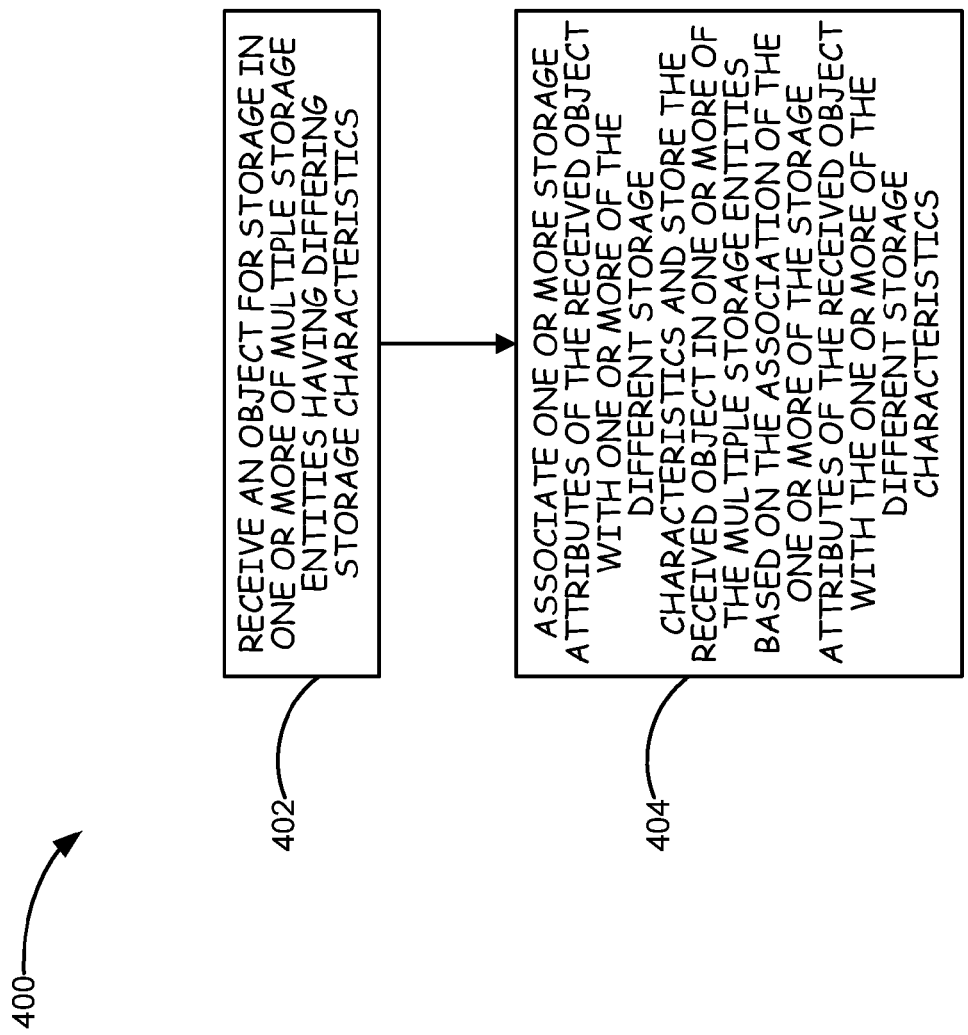

DATA STORAGE MANAGEMENT IN HETEROGENEOUS MEMORY SYSTEMS

BRIEF DESCRIPTION OF THE DRAWINGS

FIG. 4 is a flow diagram of an embodiment of a method of data storage management.

DETAILED DESCRIPTION

Figure 1:
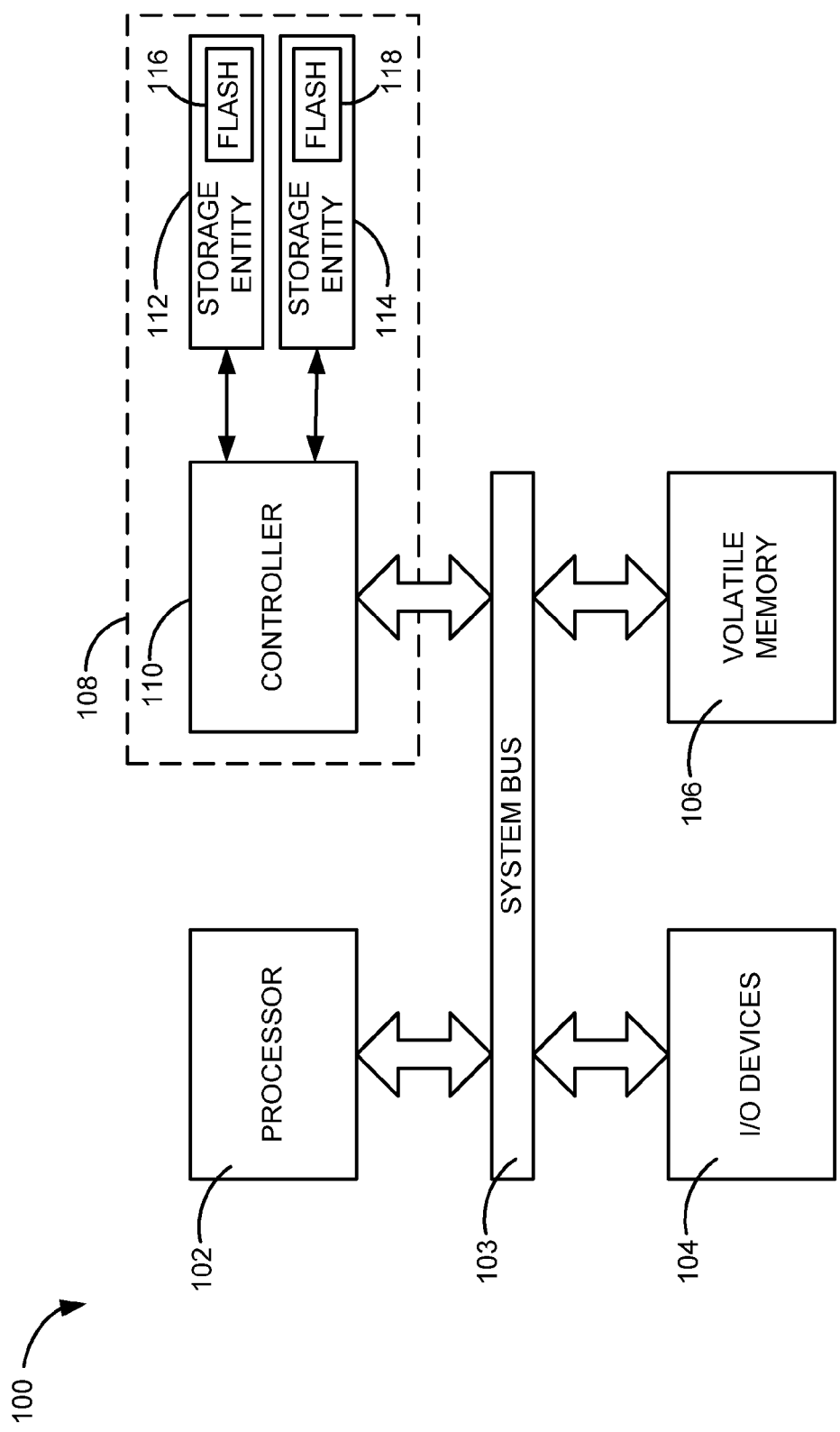
FIG. 1 is a diagram of an illustrative embodiment of a system of data storage management.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related, in a particular example, to data storage management in systems with multiple storage entities. In one example, a storage entity can be a component that includes one or more memories accessible to a controller that is external to the storage entity. The systems and methods described herein are particularly useful for flash memory systems; however, the systems and methods described herein can be applied to any type of memory system, for example to improve data storage management. In some embodiments, each of the multiple storage entities is included in a different one of multiple parallel-connected channels.

In the field of data storage systems, devices such as disc drives and tape drives typically have a single channel to the data storage medium, making many of these disc drives inherently single threaded for storage access. Advanced solid state drives, however, typically have multiple parallel-connected channels each of which provides access to one or more flash devices. To provide data distribution, high performance solid state drives exploit hardware parallelism by providing, for example, flexible logical-to-physical mapping schemes that allow perhaps any logical block to go to any channel. However, such methods may perform suitably when the parallelism has relatively equal capability and/or availability, but may not be optimal when capability and/or availability vary across the parallel channels. In general, in devices with multiple memories, a method for optimal data distribution is desired.

In a particular embodiment, a system is disclosed that includes multiple storage entities with differing storage characteristics. A controller is communicatively coupled to each of the multiple storage entities. The controller is configured to associate one or more storage attributes of a received object with one or more of the different storage characteristics, and to store the received object in one or more of the multiple storage entities based on the association of the one or more of the storage attributes of the received object with the one or more of the different storage characteristics.

In another particular embodiment, a system is disclosed that includes multiple storage entities with differing memory block sizes. A controller is communicatively coupled to each of the multiple storage entities. The controller is configured to associate a block size of a data block within a received object with one or more of the different memory block sizes and to store the received object in one or more of the multiple storage entities based on the association of the block size of the data block within the received object with the one or more of the different memory block sizes.

In yet another particular embodiment, a method is disclosed that includes receiving an object for storage in one or more of multiple storage entities with differing storage characteristics. The method also includes associating one or more storage attributes of the received object with one or more of the different storage characteristics and storing the received object in one or more of the multiple storage entities based on the association of the one or more of the storage attributes of the received object with the one or more of the different storage characteristics.

Referring to FIG. 1, a particular embodiment of a system of data storage management is shown and generally designated 100. The system of data storage management 100 may include a processor 102 connected to a system bus 103 which also can be connected to input/output (I/O) devices 104, such as a keyboard, monitor, modem, storage device, or pointing device. The system bus 103 may also be coupled to a memory 106, which may be a random access volatile memory, such as dynamic random access memory (DRAM). The system bus may also be coupled to a memory device 108. In a particular embodiment, the memory device 108 comprises multiple storage entities that may include, for example, non-volatile flash memory.

The memory device 108 may include a controller 110, which may be coupled to the processor 102 via a connection through the system bus 103. As indicated above, the memory device 108 may also contain multiple storage entities 112 and 114. In a particular embodiment, storage entities 112 and 114 include at least one flash memory 116, 118.

During operation, the processor 102 may send a command and data to the memory device 108 to retrieve or store data. The controller 110 can receive the command and data from the processor 102 and then manage the execution of the command to store or retrieve data from storage entities 112 and 114.

In some embodiments, storage characteristics of data storage entities 112 and 114 differ. Also, storage attributes such as object size, block size (a size of each individual block that makes up the object), etc., of objects received for storage in device 108 can differ. In an example, controller 110 of device 108 is capable of associating one or more storage attributes of a received object with one or more of the different storage characteristics and to store the received object in one or more of the multiple storage entities 112, 114 based on the association of the one or more of the storage attributes of the received object with the one or more of the different storage characteristics.

An object can be a set of logical blocks with some relationship that groups them according to some self-similar characteristic(s). A set of logical blocks with continuous logical block addresses (LBAs) is one way of determining an object. Other ways include, for example, explicit host directives such as handle or key, similar entropy as detected by compression rate through a compression algorithm, and repetition of data sequences among a set of logical blocks. Additionally, spatial proximity can indicate object boundaries as can temporal proximity in which long inter-command times may indicate an object boundary while small times indicate that the logical blocks may belong to a single object. Thus, when an object includes multiple blocks, the multiple blocks of the object can include explicitly specified sets of blocks such as with a file system, or an inferred set of blocks such as those identified by a detector that finds blocks with self similar characteristics. Each object can also be a single logical block with each of the logical blocks being of a fixed size. Also, an object can be a single logical block of varying size, including the notion of blocks that are compressed at variable rates.

Figure 2A:
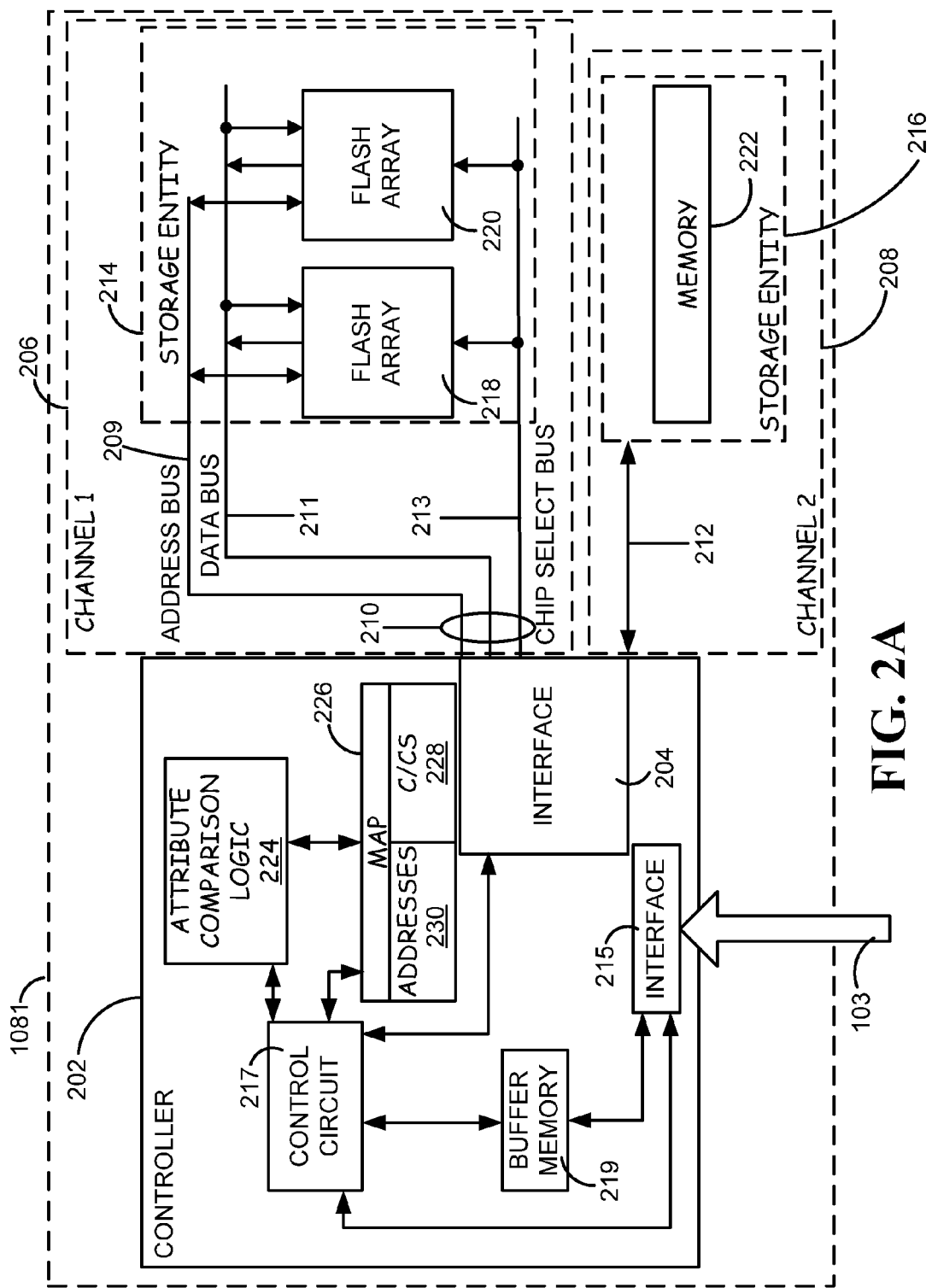
FIGS. 2A through 2C are diagrams of other illustrative embodiments of systems of data storage management.

Referring to FIG. 2A, an embodiment of a memory device 1081, which is a particular embodiment of device 108, is shown. The memory device 1081 may include a controller 202, which includes a memory interface 204 that is coupled to a first channel (channel 1) 206 and a second channel (channel 2) 208, with each of the channels 206, 208 including at least one memory. In another embodiment, more channels may be coupled to interface 204. In the interest of simplification, circuitry within memory interface 204 that allows controller 202 to select one of channels 206 and 208 is not shown. Any suitable processor or suitable combination of processors along with one or more computer storage media may be used to implement controller 202.

Each channel 206, 208 includes a communication bus 210, 212, which can include a data bus, an address bus, etc., and at least one storage entity 214, 216. In the interest of simplification, data bus 211, address bus 209 and chip select bus 213 are only show in channel 206. Each storage entity 214, 216 may include at least one memory 218, 220, 222. If a storage entity includes more than one memory, some of the multiple memories may be in a coupled configuration. In a coupled configuration, two memories (such as 218 and 220), for example, are coupled to a single data bus in a manner that allows for a page width and a data transfer rate that is double that of a page width and a transfer rate of the individual memories 218, 220. Of course, more than two memories can be coupled in such a manner. In an uncoupled configuration, data is transferred to, and read from, either memory 218 or 220 individually and separately. In some embodiments, one or more of memories 218, 220 and 222 are flash memories.

The controller 202 may be coupled to the system bus 103 via an interface 215 that can receive and send commands and data to a host, such as the processor 102 in FIG. 1. The interface 215 may pass the command to control circuit 217 for processing and also store the received data in a buffer memory 219. The buffer memory 219 may also include metadata or storage attributes (information that describes the content, quality, condition, origin, and/or other characteristics of data) associated with the data. The memory interface 204 can receive data and/or the attributes associated with the data from the buffer memory 219 to be written to one or both of storage entities 214 and 216. Also, memory interface 204 can receive data and/or the storage attributes associated with the data from the buffer memory 219 to be written to one of the memory arrays 218 or 220 and receive address bits from the control circuit 217. The memory interface 204 may assert corresponding data and address bits with appropriate timing and format to a selected flash array. Memory interface 204 may also read previously stored data and/or the storage attributes associated with the data from storage entities 214 and 216. This includes reading previously stored data and/or the storage attributes associated with the data from any selected sector of memory array 218, 220 or 222.

As noted above, storage entities such as 214, 216, or channels 206, 208, can have different storage characteristics. In different embodiments, storage entities 214, 216, or channels 206, 208, can be distinguished by characteristics such as:
Varied effective physical block sizes due to varied coupling of multiple memories on the channel's memory bus;
Varied physical block sizes due to varied memory types, for example;
Varied bandwidth due to varied channel and/or memory capabilities;
Varied retention capabilities and error rates;
Other various performance characteristics such as latency, average power, and typical energy per byte due to varied channel and/or memory capabilities.

In an example of the disclosure, controller 202 makes decisions when allocating storage space in storage entities 214 and/or 216 for the object and while servicing the object. The decisions allocate storage of objects according to the storage and/or retrieval needs of the object, which are determined from the storage attributes of the object.

Controller 202 comprises attribute comparison logic 224 that associates one or more storage attributes of a received object with one or more of the different storage characteristics of available storage entities 214, 216 and allocates space in one or more storage entities 214, 216 based on the association. The object is then stored in the selected storage entity 214, 216 or in some cases split between storage entities 214 and 216.

Storage characteristics can be stored in a map 226, for example, that maps storage characteristics 228 of storage entities 214 and 216 as a function of storage entity physical addresses 230, which may include physical addresses of storage locations within storage entities 214 and 216. Controller 202 preferably schedules an object for storage in a storage entity 214, 216, which minimally meets the storage attribute(s) of the object or that optimally exceeds the storage attribute(s).

As noted above, storage entities 214, 216, or channels 206, 208, can be distinguished by varied physical block sizes due to varied memory types or varied effective physical block sizes due to varied coupling of multiple memories on the channel's memory bus. Thus, in some embodiments, a memory device such as 1081 can include heterogeneous memory or heterogeneous storage entities with homogeneous coupling. In other embodiments, a memory device such as 1081 can include homogeneous memory or homogeneous storage entities with heterogeneous coupling.

Figure 2B:
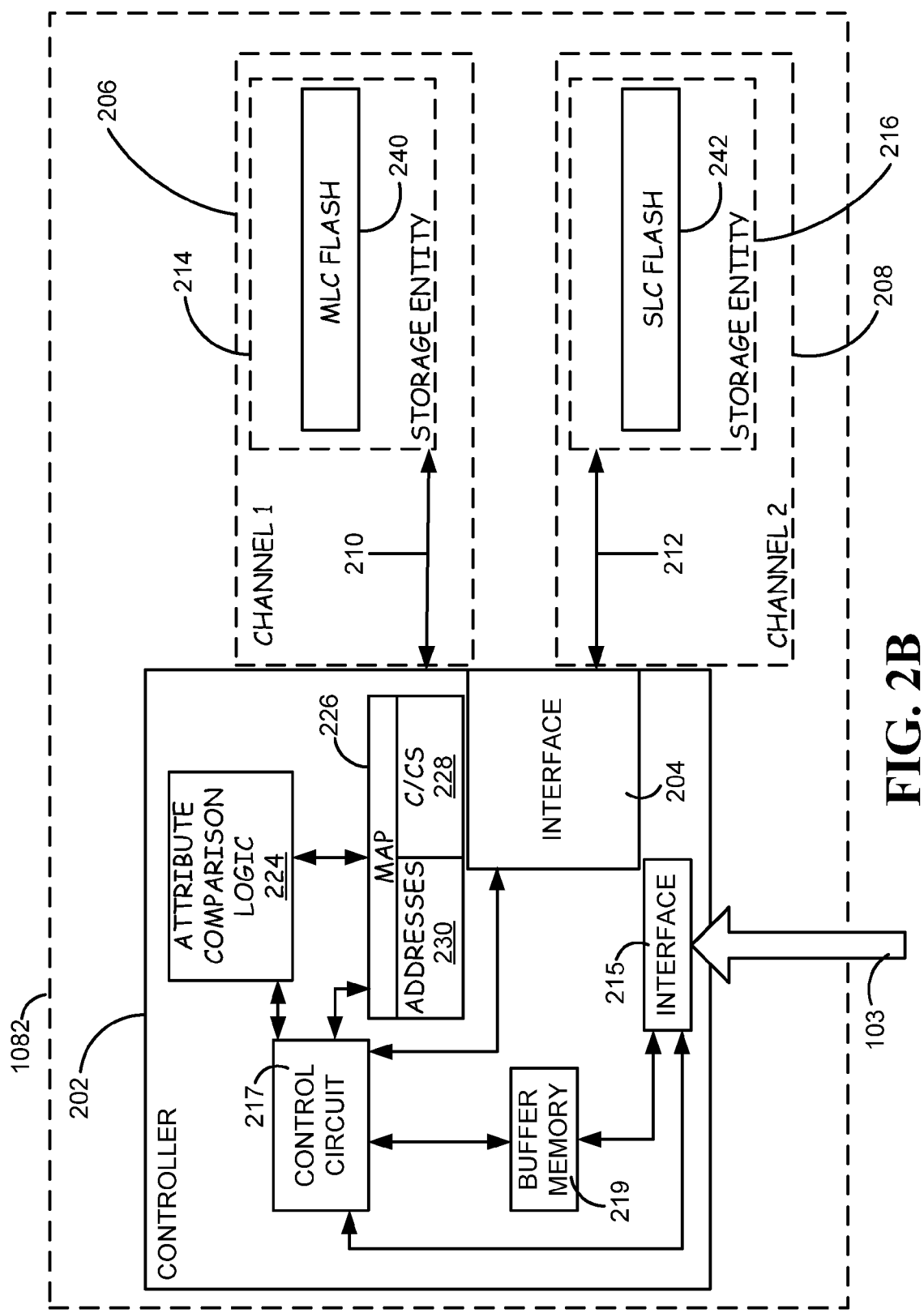

Referring now to FIG. 2B, a particular embodiment of a memory device 1082, which includes heterogeneous storage entities, is shown. In FIG. 2B, a primary distinguishing characteristic between storage entity 214 and storage entity 216 is that storage entity 214 includes multi-level cell (MLC) flash memory 240 and storage entity 216 includes single-level cell (SLC) flash memory 242. In this embodiment, the channel buses 210 and 212 are homogeneous or the coupling provided by channel bus 210 does not vary substantially from the coupling provided by channel bus 212. The remaining components of device 1082 are substantially similar to device 1081 of FIG. 2A and therefore, in general, the same reference numerals are used for similar elements. The devices shown in FIGS. 2A and 2B operate in a similar manner and therefore no further description is provided in connection with FIG. 2B.

Figure 2C:
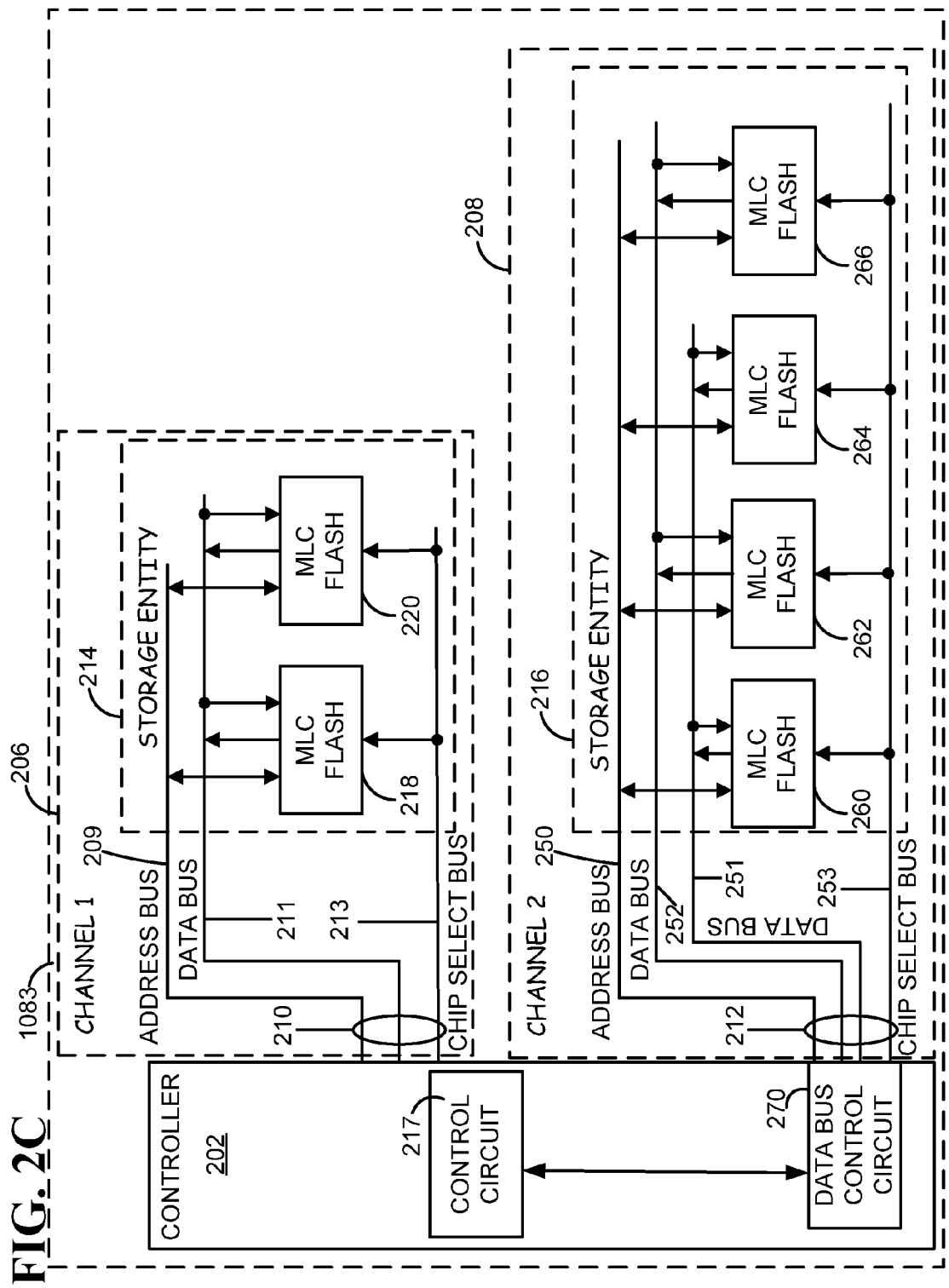

Referring now to FIG. 2C, a particular embodiment of memory device 1083, which includes homogeneous storage entities (for example, in the embodiment of FIG. 2C, both storage entities 214 and 216 include only MLC flash) with heterogeneous coupling (that is, coupling provided by bus 210 differs from the coupling provided by bus 212), is shown. In device 1083, channel 1 (denoted by reference numeral 206) has uncoupled flash devices 218 and 220 and channel 2 (denoted by reference numeral 208) is configured to control flash devices 260, 262, 264 and 266 with or without coupling. Bus 210 of channel 1 operates in a manner described in connection with FIG. 2A and therefore the description of its operation is not repeated. However, bus 212 of channel 2 includes two data buses 251 and 252 in addition to an address bus 250 and a chip select bus 253, which are connected to flash devices 260, 262, 264 and 266 and operate in a manner similar to address bus 209 and chip select bus 213. Data bus 251 (data high bus) is coupled to flash devices 260 and 262 and data bus 252 (data low bus) is coupled to flash devices 264 and 266. Data bus control circuitry 270, within controller 202, is capable of, based on commands received from control circuit 217, simultaneously enabling both data buses 251 and 252 to operate at least two of flash devices 260, 262, 264 and 266 in a coupled configuration or enabling only one of buses 251 and 252 at any given time to operate flash devices 260, 262, 264 and 266 in an uncoupled configuration. In the interest of simplification, the remaining circuitry of controller 202, which is similar to the controller circuitry in FIGS. 2A and 2B is not shown and described in connection with FIG. 2C. In such systems, the advantages of coupling can be exploited when it offers an advantage, and uncoupled access can be used when coupling has disadvantages. In particular, commands with large data transfers can have advantages with coupling and this system would use coupled channels or coupled accesses for large data transfers. Similarly, small transfers and metadata (which tends to be small) can emphasize the disadvantages of coupling such as lower packing efficiency, higher wear and higher power, and this system would use uncoupled accesses for small transfers.

Figure 3A:
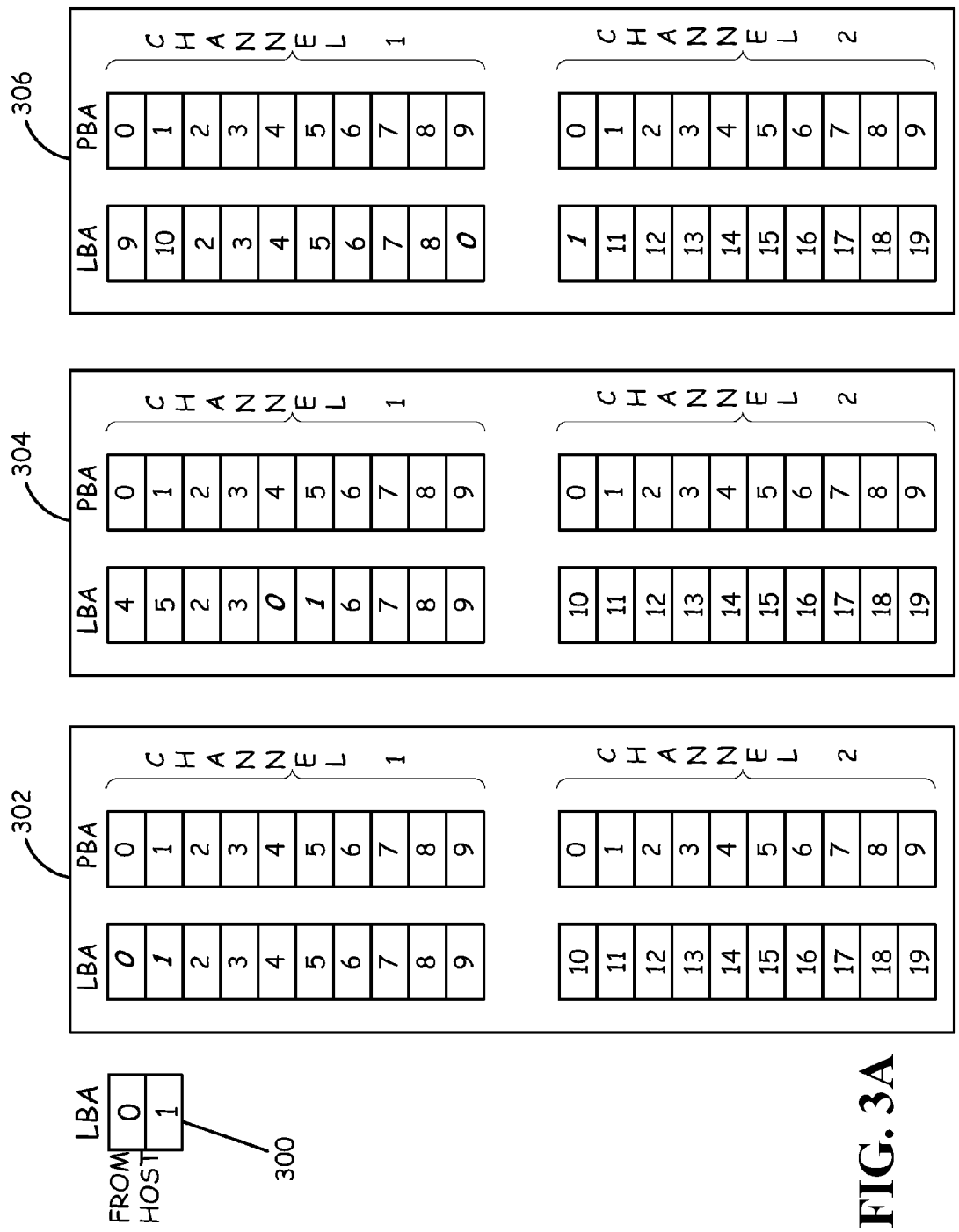
FIGS. 3A through 3C illustrate how flexible mapping of logical to physical blocks can be utilized in an illustrative embodiment of a system of data storage management.
Figure 3B:
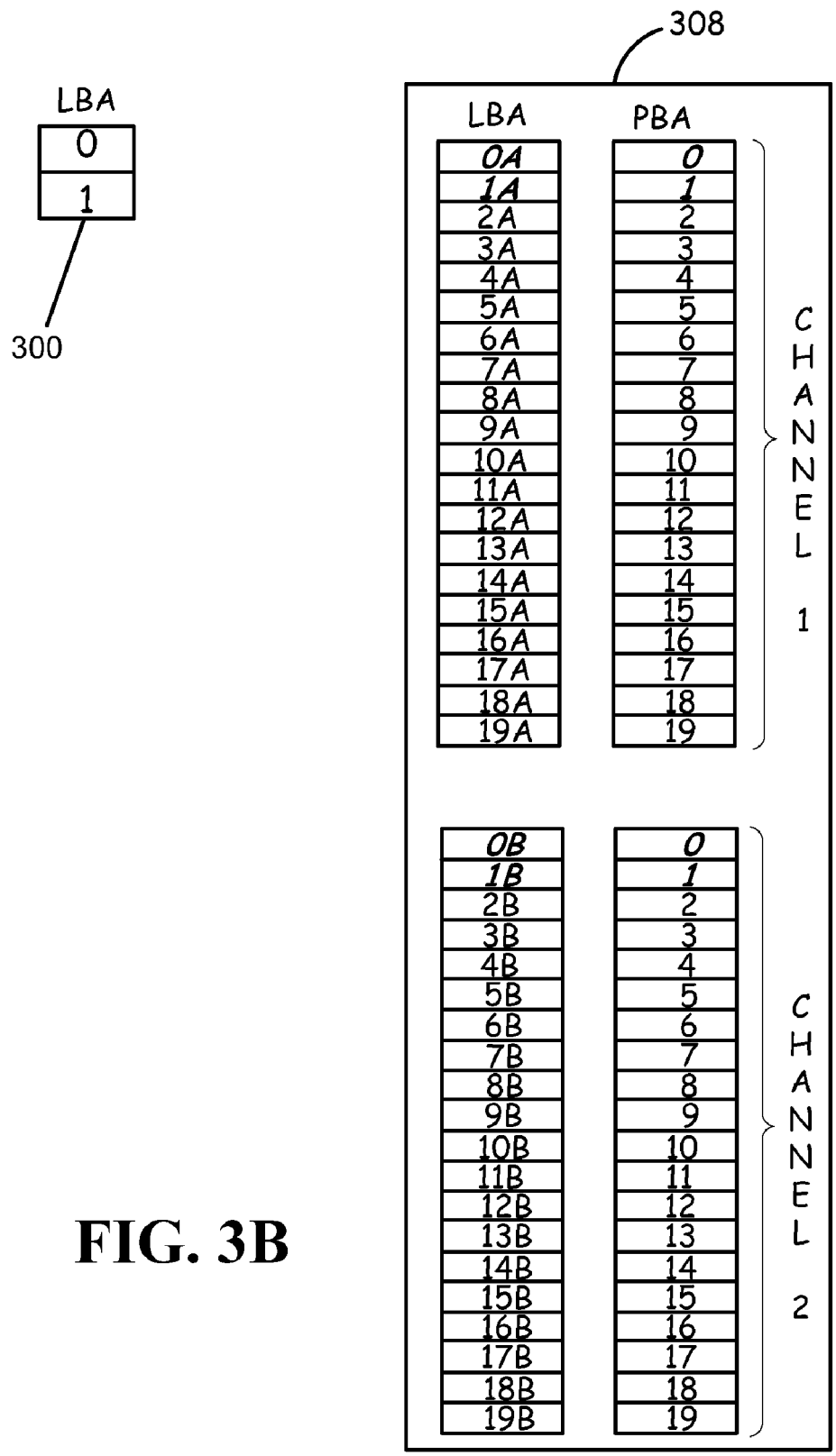
Figure 3C:
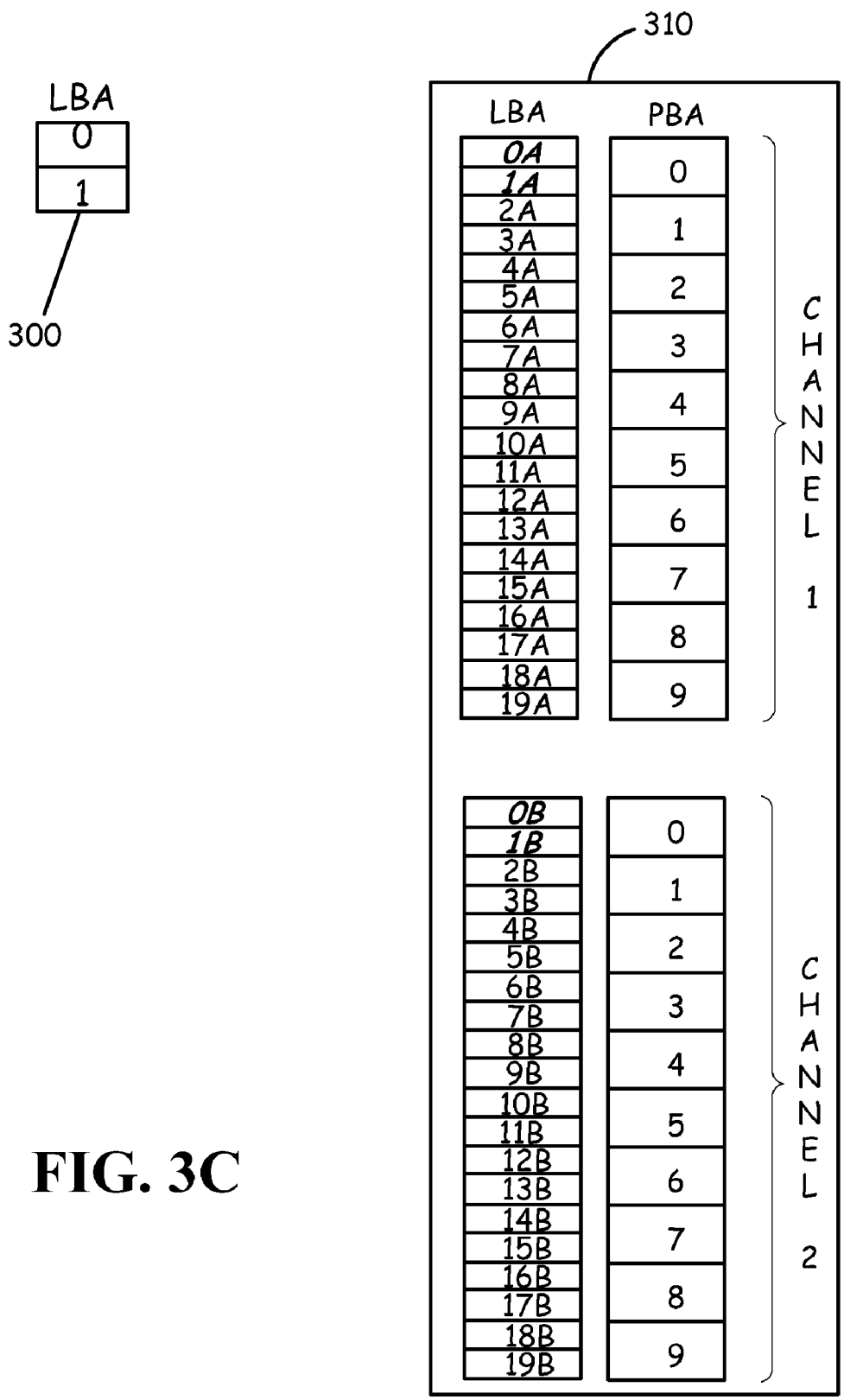

To enable storage of a received object into one or more of the multiple storage entities 214, 216 based on the association of the one or more of the storage attributes of the received object with the one or more of the different storage characteristics, a flexible logical-to-physical mapping scheme can be provided in memory devices 1081, 1082 and 1083. FIGS. 3A through 3C illustrate how flexible mapping of logical to physical blocks is utilized in an illustrative embodiment of a system of data storage management. In the example of FIG. 3A, item 300 is an object sent from a host, such as the processor 102 of FIG. 1. Object 300 has two logical blocks LBA 0 and LBA 1. Mapping scenario 302 illustrates a simplest form of mapping in controller 202. In this mapping scenario, LBA 0 from object 300 is assigned to physical block PBA 0 of channel 1 and LBA 1 goes to PBA 1 of channel 1. Of course, an equally simple and similar scenario for mapping would be to assign LBA 0 from object 300 to physical block PBA 0 of channel 2 and LBA 1 to PBA 1 of channel 2. In mapping scenario 304, LBA 0 of object 300 is assigned to PBA 4 of channel 1 and LBA 1 of object 300 is assigned to PBA 5 of channel 1. LBAs 4 and 5 are moved to correspond to PBAs 0 and 1, respectively.

In mapping scenario 306, LBA 0 of object 200 is assigned to PBA 9 of channel 1 and LBA 1 of object 300 is assigned to PBA 0 of channel 2. Data from LBA 0 and LBA 1 of object 300 can concurrently be written to PBA 9 of channel 1 and PBA 0 of channel 2, respectively.

In FIG. 3B, mapping scenario 308 shows each LBA of object 300 split into multiple (specifically 2) sub-LBAs. This splitting is carried out to divide the LBAs of object 300 into a same level of granularity as that of the physical blocks in channels 1 and 2. A first portion of LBA 0 of object 300 (LBA 0A) can be assigned to PBA 0 of channel 1 (or any other PBA in channel 1) and a second portion of LBA 0 of object 300 (LBA 0B) can be assigned to PBA 0 of channel 2 (or any other PBA in channel 2). LBA 1 of object 300 is similarly split up into LBA 1A and LBA 1B and assigned to PBA 1 of channel 1 and PBA 1 of channel 2, respectively.

In FIG. 3C, mapping scenario 310 shows multiple (specifically 2) sub-LBAs per PBA. In this example, splitting of LBAs of object 300 is carried out even though a granularity level of the physical blocks is not the same as the example shown in FIG. 3B. In FIG. 3C, a first portion of LBA 0 of object 300 (LBA 0A) is assigned to PBA 0 of channel 1 (or any other PBA in channel 1) and a second portion of LBA 0 of object 300 (LBA 0B) is assigned to PBA 0 of channel 2 (or any other PBA in channel 2). LBA 1 of file 300 is similarly split up. In general, the division method of FIG. 3C splits logical blocks to multiple channels. The splitting method for n channels may be every $n^{th}$ bit, every $n^{th}$ byte, or $1/n^{th}$ parts of the block. Splitting of the data within a logical block makes every access capable of n-way concurrency.

Certain embodiments include the capability of combining data form multiple LBAs and storing the combined data in a physical block that is large enough to accommodate the combined data. In essence, received objects or individual blocks within the received objects can be combined to a level of granularity that corresponds to a level of granularity of at least one physical block in a storage entity. Thus, in devices that include physical blocks of different sizes, received blocks can be grouped to a level of granularity that is larger that (or equal to) some physical blocks and smaller than (or equal to) some other physical blocks, which may be coupled blocks. Grouping received blocks in varying granularity can involve varying the number of blocks or varied granularity due to varying compression rates.

Referring to FIG. 4, a very simplified flow diagram of a particular illustrative embodiment of a method of data distribution management is shown and generally designated 400. The method 400 may be implemented via controller 202 and channels 206 and 208. The method 400 may include receiving an object for storage in one or more of multiple storage entities having differing storage characteristics, at 402. The method may also include associating one or more storage attributes of the received object with one or more of the different storage characteristics and storing the received object in one or more of the multiple storage entities based on the association of the one or more of the storage attributes of the received object with the one or more of the different storage characteristics, at 404.

In accordance with various embodiments, the methods described herein may be implemented as one or more software programs running on a computer processor or controller, such as the controller 110 or the controller 202. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above sections and/or arrangement of paragraphs are provided for ease of reading only and, for example, do not limit one or more aspects of the disclosure discussed in a particular section with respect to a particular example and/or embodiment from being combined with, applied to, and/or utilized in another particular example, and/or embodiment which is described in another section. Elements, features and other aspects of one or more examples may be combined and/or interchangeable with elements, features and other aspects of one or more other examples described herein.

The above-disclosed subject matter is to be considered illustrative, and not restrictive, and the appended and/or issued claims are intended to cover all such modifications, enhancements, and other embodiments, which fall within the true spirit and scope of the present invention. Thus, to the maximum extent allowed by law, the scope of the present invention is to be determined by the broadest permissible interpretation of the appended and/or issued claims and their equivalents, and shall not be restricted or limited by the foregoing detailed description.

What is claimed is:

1. A system comprising:
    multiple storage entities with differing storage characteristics, wherein each of the multiple storage entities is a different channel, and wherein at least one of the different channels includes multiple memories coupled together and at least another one of the different channels includes at least one uncoupled individual memory, and wherein the coupled memories have a different effective block size than the at least one uncoupled memory; and
    a controller, communicatively coupled to the multiple storage entities, configured to associate one or more storage attributes of a received object with one or more of the different storage characteristics and to store the received object in one or more of the multiple storage entities based on the association of the one or more of the storage attributes of the received object with the one or more of the different storage characteristics.

2. The system of claim 1 wherein at least one of the different channels includes memories with dynamically selectable coupling.

3. The system of claim 1 wherein the different storage characteristics belong to a same characteristic category.

4. The system of claim 3 wherein the same characteristic category is an effective block size, and wherein the different storage characteristics are different effective block sizes and wherein the one or more storage attributes of the received object associated with the different storage characteristics comprise a block size attribute for each individual block of the received object.

5. The system of claim 1 wherein at least some of the different storage characteristics are different bandwidths and wherein the one or more storage attributes of the received object associated with the different storage characteristics comprise a bandwidth attribute for the received object.

6. The system of claim 1 wherein the controller is further configured to split an individual block of the received object to a level of granularity that is less than or equal to a block size of a physical block of at least one of the multiple storage entities.

7. The system of claim 1 wherein the controller is further configured to combine received objects or individual blocks within the received objects to a level of granularity that corresponds to a level of granularity of at least one physical block of at least one of the multiple storage entities.

8. A system comprising:
    multiple storage entities with differing effective memory block sizes, wherein each of the multiple storage entities is a different channel and wherein the different effective memory block sizes are a function of coupling mechanisms used to couple memories to memory buses within the different channels; and
    a controller, communicatively coupled to the multiple storage entities, configured to associate a block size of an individual block of a received object with one or more of the different effective memory block sizes and to store the received object in one or more of the multiple storage entities based on the association of the block size of the individual block of the received object with the one or more of the different effective memory block sizes.

9. The system of claim 8 wherein the controller is further configured to split an individual block of the received object to a level of granularity that is less than or equal to a block size of a physical block of at least one of the multiple storage entities.

10. A system comprising:
    multiple storage entities with differing storage characteristics; and
    a controller, communicatively coupled to the multiple storage entities, configured to associate one or more storage attributes of a received object with one or more of the different storage characteristics and to store the received object in one or more of the multiple storage entities based on the association of the one or more of the storage attributes of the received object with the one or more of the different storage characteristics, the controller is further configured to split an individual block of the received object to a level of granularity that is less than or equal to a block size of a physical block of at least one of the multiple storage entities.

11. The system of claim 10 wherein the controller is further configured to combine received objects or individual blocks within the received objects to a level of granularity that corresponds to a level of granularity of at least one physical block of at least one of the multiple storage entities.

* * * * *